US010223581B2

(12) United States Patent
Walsh et al.

(10) Patent No.: US 10,223,581 B2
(45) Date of Patent: Mar. 5, 2019

(54) SYSTEM AND METHOD FOR VIDEO ANALYSIS

(71) Applicant: Interactive Intelligence Group, Inc., Indianapolis, IN (US)

(72) Inventors: Richard J. Walsh, Raleigh, NC (US); David Allan Ertel, II, Durham, NC (US)

( * ) Notice: Subject to any disclaimer, the term of this patent is extended or adjusted under 35 U.S.C. 154(b) by 24 days.

(21) Appl. No.: 14/979,414

(22) Filed: Dec. 27, 2015

(65) Prior Publication Data
US 2017/0185829 A1 Jun. 29, 2017

(51) Int. Cl.
*G06K 9/00* (2006.01)
*G06T 7/00* (2017.01)
*G10L 25/57* (2013.01)
*G10L 25/63* (2013.01)

(52) U.S. Cl.
CPC ..... *G06K 9/00348* (2013.01); *G06K 9/00342* (2013.01); *G06K 9/00711* (2013.01); *G06T 7/004* (2013.01); *G10L 25/57* (2013.01); *G10L 25/63* (2013.01); *G06T 2207/10016* (2013.01); *G06T 2207/30196* (2013.01)

(58) Field of Classification Search
CPC .......... H04M 3/5175; H04M 3/42221; H04M 3/5183; H04M 3/5233; A63B 24/0062; G06F 19/3481; G06Q 10/10
See application file for complete search history.

(56) References Cited

U.S. PATENT DOCUMENTS

| | | | | |
|---|---|---|---|---|
| 7,664,794 B2* | 2/2010 | Kasmirsky | ........ | G06F 17/30017 707/640 |
| 8,831,205 B1* | 9/2014 | Wu | ...... | H04M 3/5233 370/352 |
| 9,160,854 B1* | 10/2015 | Daddi | ................ | H04M 3/5175 |
| 9,325,849 B1* | 4/2016 | Brydon | .............. | H04M 3/5233 |
| 2005/0114379 A1* | 5/2005 | Lee | ......... | G06Q 10/10 |
| 2009/0016522 A1* | 1/2009 | Torres | ............... | H04M 3/42221 379/265.06 |
| 2010/0231714 A1* | 9/2010 | Flores | ............. | G08B 13/19613 348/143 |
| 2011/0141219 A1 | 6/2011 | Yeh | | |
| 2012/0081531 A1 | 4/2012 | DeAngelis et al. | | |

(Continued)

OTHER PUBLICATIONS

International Search Report and Written Opinion issued in corresponding International Application No. PCT/US2016/68501, dated Mar. 29, 2017, 7 pages.

*Primary Examiner* — Bhavesh M Mehta
*Assistant Examiner* — Ian L Lemieux

(57) ABSTRACT

A system and method are presented for video analysis. In an embodiment, video analysis may be applied in a contact center environment to aid contact center agents in improving the effectiveness of interactions. Feedback may be provided in real time to an agent on their interaction. Body mechanics may be examined and rated. In an embodiment, body mechanics may be combined with indicators which inform an agent on their performance. Tips may also be provided to an agent on how to improve performance in the form of audio overlay, video overlay, reports, or any combination of these. Feedback may also be used to improve the routing of communications within the contact center. Static and dynamic visual characteristics may also be used to improve routing decisions.

20 Claims, 2 Drawing Sheets

(56) References Cited

U.S. PATENT DOCUMENTS

2013/0204675 A1\* 8/2013 Dobell ............. G06Q 10/06398
705/7.42
2015/0286858 A1   10/2015 Shaburov et al.
2016/0180277 A1\* 6/2016 Skiba ............... G06Q 10/06398
379/265.06

\* cited by examiner

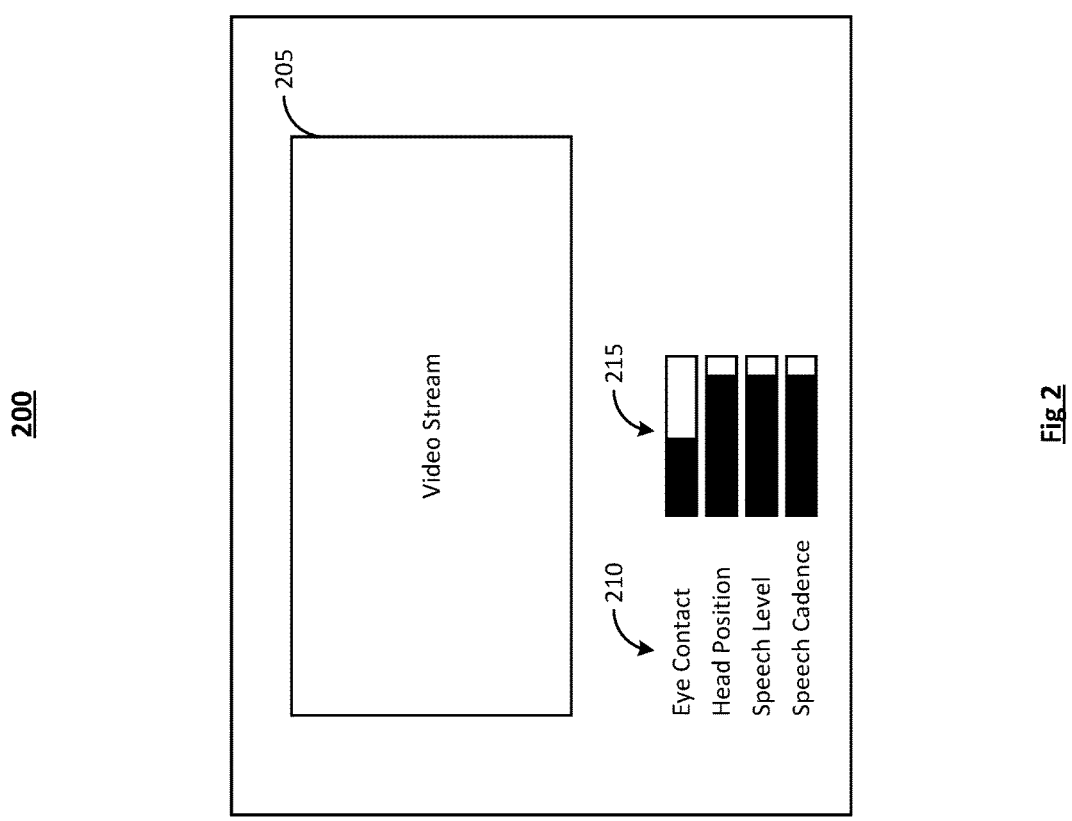

SYSTEM AND METHOD FOR VIDEO ANALYSIS

BACKGROUND

The present invention generally relates to telecommunications systems and methods, as well as contact center environments. More particularly, the present invention pertains to analyzing the interactions in a contact center.

SUMMARY

A system and method are presented for video analysis. In an embodiment, video analysis may be applied in a contact center environment to aid contact center agents in improving the effectiveness of interactions. Feedback may be provided in real time to an agent on their interaction. Body mechanics may be examined and rated. In an embodiment, body mechanics may be combined with indicators which inform an agent on their performance. Tips may also be provided to an agent on how to improve performance in the form of audio overlay, video overlay, reports, or any combination of these. Feedback may also be used to improve the routing of communications within the contact center. Static and dynamic visual characteristics may also be used to improve routing decisions.

In one embodiment, a method is provided for analysis of a video stream in a contact center system, wherein the system comprises at least a video analysis system and a video server, the method comprising the steps of: receiving a plurality of video streams at the video server, wherein the plurality of video streams comprise at least a first video stream and a second video stream; providing, by the video server, the second video stream to the video analysis system; analyzing, by the video analysis system, characteristics of a communicant in the second video stream as the communicant in the second video stream interacts with a communicant from the first video stream; and providing, by the video analysis system, real-time feedback regarding characteristics of the communicant in the second video stream to that communicant in the second video stream.

In another embodiment, a method is provided for analysis of a video stream in a contact center system, wherein the system comprises at least a video analysis system and a video server, the method comprising the steps of: receiving a plurality of video streams at the video server; providing by the video server, the plurality of video streams to the video analysis system; analyzing by the video analysis system, characteristics of a communicant in each of the plurality of video streams; and providing, by the video analysis system, real-time feedback regarding characteristics of the communicant in each of the plurality of video streams to the communicant.

BRIEF DESCRIPTION OF THE DRAWINGS

FIG. 2 is a diagram illustrating an embodiment of a user interface.

DETAILED DESCRIPTION

Figure 1:
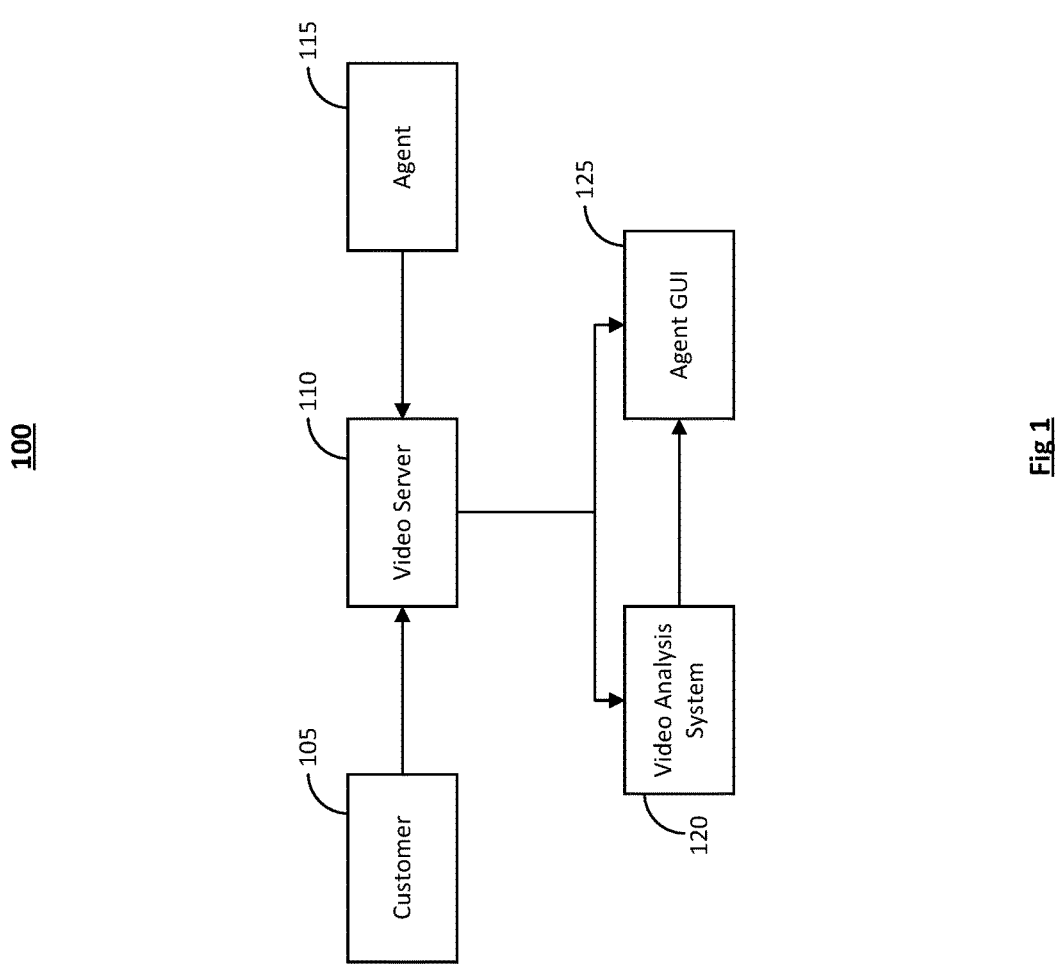
FIG. 1 is a diagram illustrating an embodiment of a system for video analysis.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In a contact center environment, contact center systems are increasingly moving to multi-media formats as opposed to only voice, or only voice and text. In these multi-media formats, video interactions are increasingly being utilized in the contact center environment. Interaction elements available to be analyzed for improved interactions in contact centers which utilized voice and/or text included transcripts and recordings. Video interactions present a new dimension of issues for contact centers to understand while agents interact over video chats. The video interactions add a visual element to the interaction between an agent and a contact which may be analyzed to improve an interaction.

FIG. 1 is a diagram of an embodiment of a system for video analysis, indicated generally at 100. Components of the system may include a customer 105, a video server 110, an agent 115, a video analysis system 120, and an agent user interface 125. In a contact center environment, for example, the customer 105 comprises a party to an interaction. The interaction may comprise a video, where the customer's outgoing video stream is received by a video server 110. The video server 110 also receives video stream from an agent 115. The video server 110 relays an agent's outgoing video stream to a video analysis system 120. The video analysis system 120 provides an analysis of the agent's video stream to the agent 115. This may be done through a stream of events to an agent UI 125 and/or embedded into the customer's video stream which may be provided to the agent UI 125. The agent UI 125, which may comprise a customer interaction UI, receives video stream from the customer. The agent UI 125 may additionally receive feedback from the video analysis system 120. In an embodiment, feedback may be provided in real-time to an agent 115 on the interaction in order to improve communication by the agent 115 with the customer 105. The video analysis system 120 may comprise a real-time video processing algorithm which runs in tandem with the contact center software. The contact center software may comprise contact center solutions, such as Interactive Intelligence's PureCloud Engage, CIC, or other contact center management software or collaboration software. The system analyzes the video stream using specialized logic to determine if an agent is achieving the proper characteristics. The contact center software may also be configured to weigh attributes more or less, such as whether an agent's eyes are closed, the apparel of an agent is frumpy, head is down, etc.

FIG. 2 is a diagram of an embodiment of a user interface (UI), indicated generally at 200. In an embodiment, the UI 200 may be used by an agent in a contact center. The UI 200 may be displayed at an agent's workstation and/or on a device screen. The UI 200 may comprise at least a video stream window 205 and analysis facets 210 of body mechanics, such as eye contact, head position, facial expressions, body posture, speech level, speech cadence, pitch, tone, etc. In the example illustrated in FIG. 2, indicator bars 215 are used to convey to an agent what the agent needs to focus on to improve communication as the interaction is occurring. The indicators 215 may alter in real-time during the interaction, allowing an agent to adjust their body mechanics as they interact with a customer through the UI 200, allowing for a more effective customer interaction. The effectiveness of the interaction may be determined based on characteristics for an industry or a particular organization. In an embodiment, if an agent is not making eye contact, but their positioning and speech are within the thresholds, the indicators 215 may tell the agent to improve their eye contact. In a non-limiting example, the system may be configured with thresholds at a certain percentage, such as a range of <30% provides "severe" feedback to an agent, 31-60% provides a "warning", 61-80% provides "gentle" feedback, and 81-100% provides "happy" feedback. The system may also be able to learn which percentages provide a desired outcome, such as a happy customer or a purchase.

Other indicators may also be used to provide feedback. Tips may be provided to the agent for real-time improvement, such as "speak slowly", "enunciate clearly", or "make eye contact", among others. In an embodiment, the tips may be provided via audio overlay, visual overlay, or in the form of reports with scoring as opposed to a correction mechanism. In another embodiment, the tips may also comprise a virtual correction mechanism with arrows or outlines which indicate how a communicant should move to be more effective. In another embodiment, a visualization of an agent's speech characteristics (e.g., cadence, pitch, tone) may be shown to the agent along with a comparison to a configured ideal agent. The configured ideal agent would have ideal speech characteristics and corrective hints that can be compared against the agent to aid in the interaction.

In an embodiment, video analysis may also be used to improve upon communication routing in the contact center using static and/or dynamic visual characteristics. Some characteristics, such as an agent's clothing style or general appearance, may be static (e.g., not amendable to immediate change or correction). Static visual characteristics may nonetheless be used to improve routing decisions. Agents may be graded for visual effectiveness during each work session and a score generated which can be used for routing purposes in future interactions. In an embodiment, during an interaction, a snapshot may be taken of an agent prior to answering a call (or during system sign-in), in order to perform an initial analysis to determine contact routing. Agents with a high visual effectiveness may be assigned to a queue with high-value customers, while agents with a low visual effectiveness may be assigned to a queue with lower value customers. Unlike skills based routing, visual effectiveness of an agent may change from session to session along with an agent's appearance and attentiveness. With skills based routing, skill may never change for an agent as an agent may always have the same certifications, skills, and language proficiencies.

In an embodiment, visual tagging may be used to improve routing. As an alternative to a visual effectiveness rating, video analysis may be used to tag agents during a work session. An agent may be tagged by superficial appearance (e.g. formal, dark clothes, light clothes, to name a few non-limiting examples). Tags may then be used to assign agents to queues on a session basis.

Emotional tags may also be generated using advanced audio visual analysis, such as "happy", "tense", "frustrated", etc. An aggravated interaction, such as when a customer raises their voice or has a difficult problem, may be routed to agents with particular tags. Unlike skills-based routing, these tags may change from session to session, or even within a work session. An agent may be less exhausted at the beginning of a session or after a break, than after a long period without a break. Some agents may also have more stamina than others for continual interactions. Thus, using audio visual analysis, agents may service different queues as their behavior changes during a session.

In an embodiment, different methods may be used for visual matching of customers with agents. A new customer video interaction may be tagged with specific products the customer is viewing, products previously viewed, products in the customer's shopping cart, or a customer's shopping history. Video analysis may also be used on the customer. For example, a formally dressed customer may be matched with a more formally dressed agent.

In one non-limiting example, an online apparel business uses video chat for interacting with customers. Some agents may be dressed more professionally (e.g. tie and jacket) whereas other agents may be dressed less professionally (e.g. t-shirt and shorts). These different appearances may appeal to different customers. Customers that initiate a video chat while shopping for formal clothes may have a better interaction with more formally dressed agents. Conversely, customers initiating a video chat while shopping for informal clothes may have a better interaction with less formally dressed agents.

In another non-limiting example, a professional sports league may operate an online apparel business. Customers looking for clothes from a specific team may be routed to agents wearing clothing from that team, similar to that team (such as similar color schemes), or possibly even clothing that is at least dissimilar to that team's rivals (e.g., avoid routing a Purdue fan to agent wearing an IU jersey).

In an embodiment, feedback may also be used to let managers know how agents are performing, such as if they are growing tired or irritable and need a break. The feedback may be delivered in the form of reports to managers or may also be used in an automatic communication distribution system to automatically route interactions away from an agent and thus ease workload.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for analysis of a video stream in a contact center system, the method comprising:
   a. receiving, by a video server, a first video stream and a second video stream;
   b. providing, by the video server, the second video stream to a video analysis system comprising:
      an independent video processing system configured to analyze individual frames of video streams in real-time and extract a plurality of visual characteristics of a communicant in a video stream; and
      a voice analysis component configured to analyze audio accompanying a video stream and extract a plurality of audio characteristics of a communicant in a video stream, and
      wherein the video analysis system is configured to send events based on the analysis back to the contact center system;
   c. analyzing, automatically by the video analysis system, using a real-time video processing algorithm, each of a plurality of extracted visual and audio characteristics of a communicant in the second video stream, as the communicant in the second video stream interacts with a communicant from the first video stream, and automatically combining the plurality of characteristics to determine combined characteristics of the communicant in the second video stream; and d. providing, by the video analysis system, real-time feedback regarding the characteristics of the communicant in the second video stream to the communicant in the second video stream based on the combined characteristics of the communicant in the second video stream.

2. The method of claim 1, wherein the characteristics comprise at least one of: eye contact, head positioning, posture, facial expressions, speech amplitude, background, clothing, aesthetics of the communicant, speech cadence, speech pitch, and speech tone.

3. The method of claim 1, wherein the communicant in the second video stream comprises a contact center agent.

4. The method of claim 1, wherein the first video stream comprises a customer's outgoing video stream.

5. The method of claim 1, wherein the second video stream comprises a contact center agent's video stream.

6. The method of claim 1, wherein the analyzing further comprises comparing the characteristics to desired characteristics that have been previously identified as successful.

7. The method of claim 1, wherein the feedback is provided to the communicant in the second video stream via at least one of: via a GUI, a feedback system, an email, a text message, or other communication.

8. The method of claim 7, wherein the feedback comprises one or more of: indicator bars, skeleton overlays, and geometric mask.

9. The method of claim 1, wherein the method further comprises providing the feedback to a third party.

10. The method of claim 1, wherein the method further comprises automatically re-routing a communicant in the first video stream to a third communicant based on the analyzing of the communicant from the second video stream in step (c).

11. A method for analysis of a video stream in a contact center system, the method comprising:

a. receiving, by a video server, a plurality of video streams at the video server;

b. providing, by the video server, the plurality of video streams to a video analysis system;

c. analyzing, by the video analysis system, using a real-time video processing algorithm, characteristics of a communicant in each of the plurality of video streams extracted from the plurality of video streams;

d. providing, by the video analysis system, real-time feedback regarding the characteristics of the communicant in each of the plurality of video streams to at least one of the communicants; and e. determining, by the contact center system, a routing decision of the communicant in a first video stream to an agent based on the analyzing of the communicant in each of the plurality of video streams in step (c);

f. automatically routing, by the contact center system, the communicant in the first video stream to the agent identified based on the analyzing of the communicant in each of the plurality of video streams in step (c).

12. The method of claim 11, wherein the characteristics comprise at least one of: eye contact, head positioning, posture, facial expressions, speech amplitude, background, clothing, aesthetics of the communicant, speech cadence, speech pitch, and speech tone.

13. The method of claim 11, wherein the video analysis system comprises one or more of: an independent video processing system that is capable of analyzing individual frames of the video streams in real-time and a voice analysis component, and wherein the video analysis system is configured to send events based on the analysis back to the contact center system.

14. The method of claim 11, wherein the communicant in at least one of the plurality of video streams comprises a contact center agent.

15. The method of claim 11, wherein at least one of the plurality of video streams comprises a customer's outgoing video stream.

16. The method of claim 11, wherein at least one of the plurality of video streams comprises a contact center agent's video stream.

17. The method of claim 11, wherein the analyzing further comprises comparing the characteristics to desired characteristics that have been previously identified as successful.

18. The method of claim 11, wherein the feedback is provided to the communicant via at least one of: via a GUI, a feedback system, an email, a text message, or other communication.

19. The method of claim 18, wherein the feedback comprises one or more of: indicator bars, skeleton overlays, and geometric mask.

20. The method of claim 11, wherein the method further comprises providing the feedback to a third party.

* * * * *